(12) United States Patent
Beaufils et al.

(10) Patent No.: US 7,458,235 B2
(45) Date of Patent: *Dec. 2, 2008

(54) PROCESS AND DEVICE FOR FORMATION OF MINERAL WOOL AND MINERAL WOOL PRODUCTS

(75) Inventors: Sebastien Beaufils, Cernoy (FR); Christophe Wagner, Athens, GA (US); Mark Trabbold, Harleysville, PA (US); Alain Yang, Bryn Mawr, PA (US)

(73) Assignee: Saint-Gobain Isover, Courbevoie (FR)

( * ) Notice: Subject to any disclaimer, the term of this patent is extended or adjusted under 35 U.S.C. 154(b) by 149 days.

This patent is subject to a terminal disclaimer.

(21) Appl. No.: 10/468,056

(22) PCT Filed: Feb. 13, 2002

(86) PCT No.: PCT/EP02/01519

§ 371 (c)(1),
(2), (4) Date: Jan. 15, 2004

(87) PCT Pub. No.: WO02/070417

PCT Pub. Date: Sep. 12, 2002

(65) Prior Publication Data

US 2004/0112093 A1    Jun. 17, 2004

(30) Foreign Application Priority Data

Feb. 14, 2001    (FR) .................................. 01 02024

(51) Int. Cl.
*C03B 37/04*    (2006.01)

(52) U.S. Cl. .......................................... 65/455; 65/456
(58) Field of Classification Search ........... 65/454–460, 65/462–467, 475, 456, 470, 495, 517, 518, 65/520–522, 524–526
See application file for complete search history.

(56) References Cited

U.S. PATENT DOCUMENTS

| 4,689,061 A | 8/1987 | Britts |
| 4,759,974 A * | 7/1988 | Barthe et al. ................. 442/400 |
| 6,245,282 B1 * | 6/2001 | Baker et al. ................. 264/555 |

FOREIGN PATENT DOCUMENTS

| EP | 1 142 839 | 10/2001 |
| WO | 99 65835 | 12/1999 |
| WO | 01 11118 | 2/2001 |

* cited by examiner

*Primary Examiner*—Richard Crispino
*Assistant Examiner*—Queenie Dehghan
(74) *Attorney, Agent, or Firm*—Oblon, Spivak, McClelland, Maier & Neustadt, P.C.

(57) ABSTRACT

A method is provided to produce fine diameter glass fibers with fewer defects through a combination of lower attenuating gas velocities and the use of spinners having more and smaller holes. The method uses a device for internal centrifugation of mineral fibers including a centrifuge equipped with a peripheral band perforated with orifices distributed in a plurality of annular zones arranged on top of each other, assuming that the centrifuge is in centrifugation position. The device includes at least two annular zones whose number of orifices per unit of surface area differs by a value greater than or equal to 5%, 10%, or 20%.

19 Claims, 3 Drawing Sheets

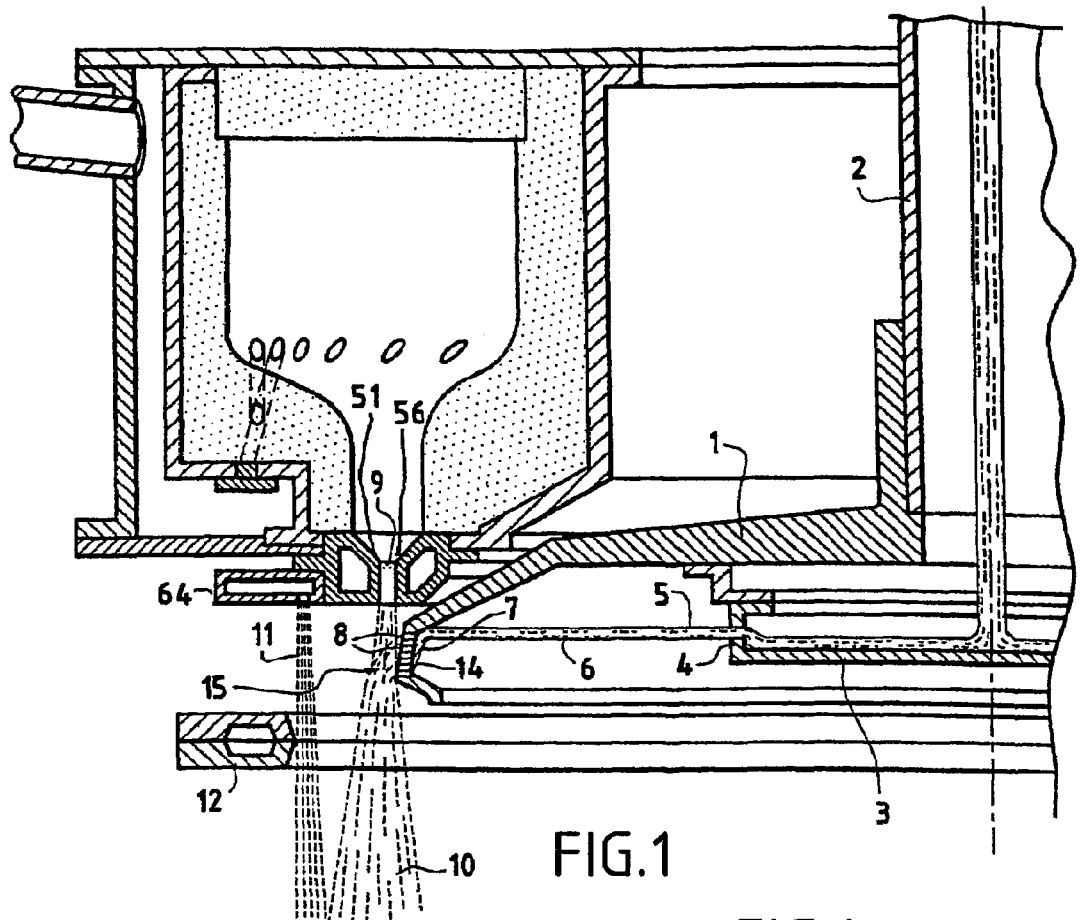
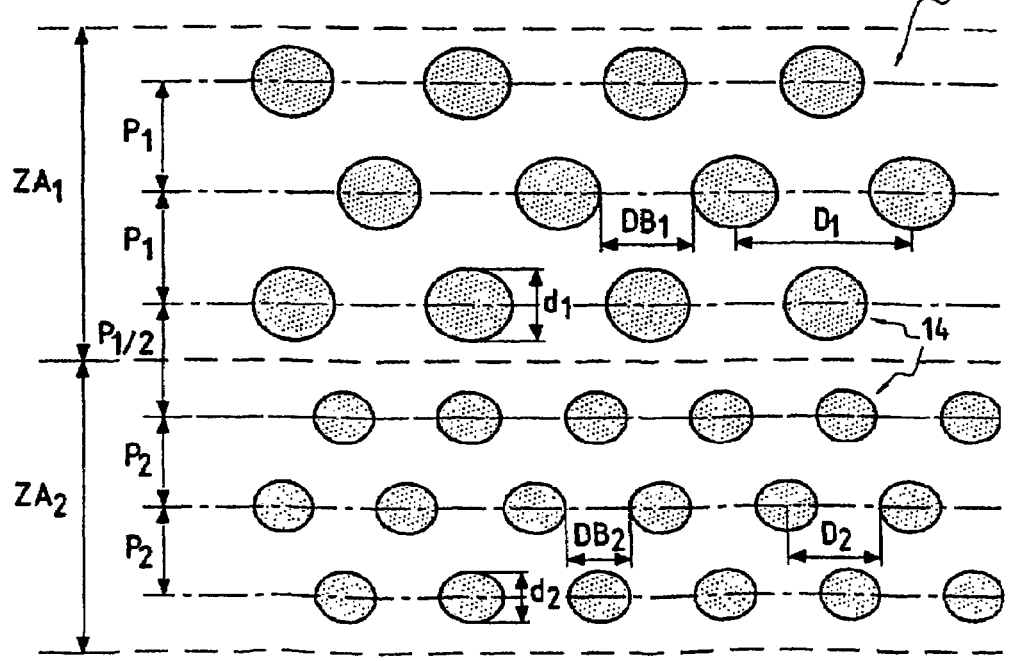

PROCESS AND DEVICE FOR FORMATION OF MINERAL WOOL AND MINERAL WOOL PRODUCTS

FIELD OF THE INVENTION

The invention relates to techniques for formation of mineral fibers or other thermoplastic materials through the process of internal centrifugation combined with drawing by a gaseous current at high temperature. It applies in particular to the industrial production of glass wool intended to be used, for example, in the composition of thermal and/or acoustic insulation products.

DESCRIPTION OF THE RELATED ART

Small diameter fibers of glass and other thermoplastic materials have been used in a variety of applications including acoustical or thermal insulation materials. When small diameter glass fibers are assembled into a web, (referred to interchangeably herein as a "blanket," "batt" or "wool pack"), glass fibers which individually lack strength or stiffness can be resin-bonded, and formed into a batt which is quite strong, lightweight, highly compressible and resilient. Insulation batts can be faced with paper or plastic, or unfaced.

The fiber-formation process to which the invention relates consists of feeding a thin stream of molten glass to a centrifuge, also called a fiberization spinner, turning at high speed and perforated on its periphery by a very large number of orifices through which glass is sprayed in the form of filaments under the action of centrifugal force. These filaments are then subjected to the action of a high-temperature and high-speed annular drawing current along the wall of the centrifuge. This current thins them down and transforms them into fibers. The fibers formed are carried along by this gaseous drawing current towards a receiving mechanism generally consisting of a gas-permeable strip. A binder required to bond the fibers into a wool product is sprayed onto the fibers as they are drawn downward. The fibers are then collected and formed into a batt. This process is known as "internal centrifugation."

The centrifugal blast, attenuation glass fiberization technique, generally described above, has been used commercially for many years in the production of glass fiber building insulation batts and blankets, and a substantial percentage of glass fiber insulation manufactured at the present time is produced utilizing this technique. Details of various forms of this process are disclosed, for example, in U.S. Pat. Nos. RE 24,708; 2,984,864; 2,991,507; 3,007,196; 3,017,663; 3,020,586; 3,084,381; 3,084,525; 3,254,977; 3,304,164; 3,819,345; 4,203,774; 4,759,974; and 5,743,932, which are hereby incorporated herein by reference.

This process has undergone several improvements, some of them relating in particular to the fiberization spinner, others to the means of generating the annular drawing current, using a specific type of burner, for example. See in particular EP-B-0 189 354; EP-B-0 519,797; WO 97/15532 concerning this last point.

SUMMARY OF THE INVENTION

Glass fiberization is extremely complex and requires the balancing of a large number of variable parameters. Many of the details of known techniques will not be repeated herein, reference, instead, being made to the above patents for such disclosures. However, certain limited aspects of the prior art will be considered, especially those concerning the present invention.

In the centrifugal blast attenuation process, the burner pressure, as well as the attenuating gas speed proximate to the spinner wall are important to an optimization of the fiber attenuation. Spinner design and operation are also important factors, particularly in view of the relatively short life of current spinner designs and the extremely high cost of spinner replacement.

Concerning the fiberization spinner, patent FR 1,382,917 (application Feb. 27, 1963) describes a fiberization device whose principle is still widely used: the molten material is led to a basket whose vertical wall contains orifices through which the material is sprayed onto the wall of a turning body, attached to the basket, and contains a great many orifices. This wall is called the "band" of the fiberization spinner. In order to obtain good quality fiberization the orifices are distributed in annular rows and the diameters of the orifices vary according to the row to which they belong, with this diameter decreasing from the top of the band to the bottom.

In the context of the invention, the "top" of the centrifuge is defined in reference to the centrifuge in centrifugation position, i.e. according to a substantially vertical axis (of rotation).

The spinners used in early centrifugal blast attenuation equipment were typically of a diameter of about 200 mm and had a peripheral wall which typically included 4,000-6,000 holes through which the molten glass passed to form the primary glass streams subjected to attenuation by the annular blast. It was perceived that there were practical limits to the pull rate per spinner orifice for maintaining acceptable fiber quality, the maximum rate per orifice ranging between about 0.9 and 1.4 Kg/day. Nonetheless, the economic demands for increasing production of a given line usually resulted in an increase in pull rate despite the deterioration in product quality.

In an effort to increase the output of a spinner of given diameter, the number of holes in the peripheral wall of the spinner has been increased to about 23,000, and the spinner diameter has been increased to about 400-600 mm. See U.S. Pat. No. 4,759,974. Although some increase in the pull rate has been achieved, there are long established beliefs in the industry that there are practical limits to orifice density increases controlled by factors such as the necessity of maintaining discrete glass streams emerging from the periphery of the spinner and other potential manufacturing problems.

Improvements have been made to this basic principle, as shown in particular in patent FR 2,443,436 where mechanisms make it possible to obtain a laminar flow of the molten material from the top to the bottom of the spinner band.

A further important factor is the fineness (average diameter) of the fibers. It is well established that for a given density of a blanket, the finer the fibers, the greater the thermal resistance of the layer. An insulating product comprising finer fibers can accordingly be thinner with the same insulating value as a thicker product of coarser fibers. Or, likewise, a product of finer fibers can be less dense than one of coarse fibers of the same thickness and have the same insulating value.

In the shipping and packaging of insulation batt and blanket products, high compressibility is preferred. It is desirable to compress the batt for shipping and then have it recover rapidly and reliably to the desired size. Current batt insulation products are limited in the amount of compression possible while still attaining adequate recovery. When the product is compressed, the binder holds firm while the fibers themselves flex. As the stress upon the fibers increases due to excessive compression, the fibers break. When fibers break, cracks typically initiate at locations of "stress-rising defects", such as cracks, blemishes, or other weak points in the fiber material. The smaller the fiber diameter, the faster a crack can propagate from a stress-rising defect through the cross-section and lead to breakage.

While finer fibers have been deemed desirable for their economic and insulating efficiencies, modern centrifugal blast techniques have not been able to produce a blanket having an average fiber diameter of much less than 3.9 microns without unacceptably reducing the ability of such a blanket to recovery from compression. While not being committed to any one theory, it is believed that current spinner and burner designs limit artisans from making finer fibers without incurring a high number of stress-rising defects in the fibers. These small cracks and imperfections generally prevent the blanket or batt made with small fibers from recovering an acceptable amount of its original thickness. Accordingly, there remains a need in the industry for fiber insulation products, such as batts and blankets, which contain fibers of less than 4 micrometers in average diameter, but which also provide adequate recovery after being compressed, such as when packaged in a roll or a polymer film. There also remains a need in the insulation industry for a centrifugal blast attenuation process for producing higher strength, finer glass and polymer fibers.

Thus the goal of the invention is to improve the device and the process of fiberization through internal centrifugation of mineral fibers. This improvement focuses in particular on the quality of the fibers obtained and on an increase in the yield of the process.

In accordance with this object, fibers can be produced within a less aggressive fiber attenuating environment so as to enable small diameter fibers of less than 3.5 microns to be used in insulation products, without sacrificing high quality or acceptable recovery after compression. In a further embodiment of the methods of this invention, a glass material is provided, which is melted and disposed in a spinner. The glass material is centrifuged through a plurality of its orifices to form a multiplicity of glass streams. The glass streams are attenuated with a gas current adjacent the exterior of the spinner to form glass fibers having an average diameter of no greater than 3.5 microns. The gas current is produced by a burner internal pressure of no greater than about 10-25 (inches water) (250-635 mm CE "colonne d'eau"), and preferably less than 23 (inches water) (580 mm CE). These small fibers are then combined with a resin to form an insulation product having an ASTM C 686 parting strength of at least about 100 gf/g, which exhibits a substantial recovery of its nominal thickness following compression.

Compared with current insulation products, such as insulation batt made with glass fibers having an average diameter of about 3.9 microns or greater, the present insulation products have a cotton-like touch feel which does not cause noticeable itching or irritation when in contact with human skin. As used herein, "insulation products" include unfaced and faced batts, blankets and rolls. Insulation products desirably include a resinous binder, but this is not always required, so long as the product has some cohesiveness, and is not a loose fill insulation product. Insulation products can be used for composite reinforcement, sound insulation and may be compressed or rendered board-like by adding additional materials. Certain embodiments of this invention, when compared to conventional batt insulation products, can provide up to 10% higher thermal insulating performance for the same density, or at least about a 20% reduction in density for the same insulating performance or R-value. These innovative products also produce an enormous amount of cost savings over similar R-value commercial batts, due to smaller glass material costs.

In another example of this invention, a glass fiber insulation product is produced by melting a glass material and centrifuging it through a plurality of spinner orifices to form a plurality of glass streams. The glass streams are then attenuated with a gas current into glass fibers having an average diameter of no greater than about 3.5 microns, followed by combining the fibers together into an insulation product having the following characteristics: an ASTM C 686 parting strength of at least about 100 gf/g; an ASTM C 167 product gram weight of about 70-100 $g/ft^2$; and an ASTM C 167 thickness recovery of about equivalent to, or better than, that of an insulation product having substantially similar external dimensions made from glass fibers having an average diameter of about 3.9 microns, with less cutting and floor dust than a 3.9 micron average diameter product.

The preferred methods of using centrifugal, blast attenuation, glass fiberization techniques described in this disclosure employ such improvements as more spinner orifices for providing more and smaller initial glass streams and/or lower fiber attenuating hot gas speeds, preferably using conventional combustion air and glass flow rates. It is believed that these techniques make the fiber attenuation more gentle and greatly reduce shocks to the glass fibers so that they are less fragile, even when produced in very small fiber diameters formally not employed in the manufacture of glass fiber batt and roll insulation.

A preferred method uses a device provided by this invention for internal centrifugation of mineral fibers including a centrifuge equipped with a peripheral band perforated with orifices distributed over a plurality of annular zones arranged on top of each other (assuming that the centrifuge is in centrifugation position) which includes at least two annular zones where the number of orifices per unit of surface area (NS) differs by an amount greater than or equal to 5%, in particular greater than or equal to 10%, and even 20%.

In a preferred method of realizing the invention, the annular zone containing the greatest number of orifices per unit of surface area is located below another annular zone containing a lower average number of orifices per unit of surface area, assuming that the centrifuge is in fiberization position.

The term "annular zone" is used to define a zone of the band of the centrifuge contained between two perpendicular planes of the axis (of rotation) of the centrifuge. In the context of the invention, such an annular zone is defined as a region where the number of orifices per unit or surface area is substantially constant over the entire part of the periphery of the band contained in the said annular zone.

The number of orifices per unit of surface area, NS, is defined as the number of orifices contained in an element of the surface of the annular zone, in particular on the order of a square centimeter, in relation to the surface area of this element of the surface. The number of orifices per unit of surface area is considered to be substantially constant if it varies by less than 0.5% over all of the elements of surface of a single annular zone. An annular zone may include a single orifice per vertical segment, but it usually contains several of them, in particular from 4 to 15. The term "vertical segment" refers to a part of the annular zone limited on the vertical axis by each of the planes defined above, as long as an average of only one orifice on a horizontal axis is observed there, assuming that the centrifuge is in fiberization position.

Mineral fibers are conventionally manufactured with a centrifuge where the number of orifices per unit of surface area is constant over the entire height of the centrifuge band. In fact, a conventional centrifuge is perforated through electrical discharge machining, with a comb composed of electrodes distributed in line where the pitch between electrodes is constant. After simultaneous perforation of orifices in a vertical column, the comb is moved to carry out the perforation of the next column, after moving the comb along the band by a distance corresponding to the horizontal gap between the center of consecutive holes.

This technique permits very precise perforation and the variations in the number of orifices per unit of surface area are extremely low, specifically less than 1 per one thousand.

A conventional centrifuge generally contains between 2000 and 40,000 orifices, specifically for average diameters of the centrifuge of 200 min to 800 mm, respectively.

It has proven to be possible to increase significantly the quality of the fiber mat, in particular its mechanical properties, while obtaining a very significant reduction in the consumption of energy, and thus the yield of the fiberization process, using a device prepared according to the invention.

This effect is especially notable in that, at constant pull rate, it is known that energy consumption decreases when the number of orifices for the same band height increases, because the more the molten material is divided, the less energy is required to draw it. When the number of orifices is increased for the same band height with a conventional centrifuge, however, the quality of the fiber mats produced does not increase, and even tends to decrease, while with the device prepared according to the invention it is possible to improve the properties of the products and the yield of the process at the same time.

Recall that in the text, reference was made to a centrifuge observed in the position of centrifugation, i.e., with the band, including the orifices, arranged in a substantially vertical manner, around the axis along which the molten material is carried during fiberization. The molten material is carried through the "top" of the centrifuge in this position. The base of the centrifuge is substantially horizontal and the annular zones are parallel to this base and are superimposed on each other in this arrangement.

A preferred centrifuge according to the invention contains at least two superimposed annular zones, the lower one having a greater number of orifices per unit of surface area than the one located above it. In a preferred method of realization the centrifuge includes at least three superimposed annular zones and each of these zones includes a greater number of orifices per unit of surface area than the one in the closest annular zone located above the annular zone considered.

According to a preferred method of realization the orifices of each zone are grouped in rows, with a diameter of orifice (d) substantially constant in each annular zone and decreasing from one annular zone to another, from the top to the bottom of the peripheral band of the centrifuge in centrifugation position.

In the invention, it is also advantageous that at least two adjacent rows have orifices of different diameters, and more specifically, that the rows have, from the top to the bottom of the peripheral band, decreasing diameters of orifices (generally all orifices of a single row have the same diameter). Thus one can anticipate, from the top to the bottom, n row(s) of orifices of a given diameter, then p row(s) or orifices of a smaller diameter, then t row(s) of orifices of a still smaller diameter, etc. with n, p and t$\geq$1.

For example, one could have a first annular zone, ZA1, consisting of n rows, a second, ZA2, consisting of p rows, and a third, ZA3, consisting of t rows.

By thus establishing a sort of decreasing "gradient" in the size of orifices from top to bottom, an improvement in the quality of fiberization has been observed. Thus it has been possible to reduce the differences in the way in which filaments coming from the highest rows were fiberized in relation to those from the lowest: this "gradient" permits a development of primary filaments exiting the orifices and a drawing process that limits crossing of trajectories, and thus impact, between the fibers being drawn from different rows of orifices, hence the improved quality observed.

This configuration is especially adapted to the production of less dense mineral wools.

In certain cases, on the other hand, one wants to encourage impact between fibers in order to reduce their length. These cases correspond to the production of dense mineral wools, particularly suitable for panels used in roofing. In these cases one could, for example, alternate the size of the orifices from one zone to another, and one can thus anticipate, from the top to the bottom, n row(s) of orifices of a given diameter, then p row(s) of orifices of a greater diameter, then t row(s) of orifices of a diameter smaller than those of the orifices of the row located above, etc.

It would be advantageous to have the rows spaced apart from each other by a distance between 1 and 2 mm, in particular from 1.2 to 1.8 mm, with preferably a pitch from one row to another of 1 to 2 mm, for example 1.2 to 1.6.

Preferably, the diameter (d) of at least a part of the orifices of the centrifuge is at the most 1.5 to 1.2 mm, in particular from 1.1 to 0.5 mm, for example between 0.9 and 0.7 mm.

According to another method of realization of the preferred device according to the invention, the distance, D, between the centers of the neighboring orifices closest to a single annular zone is substantially constant over all of a single annular zone and this distance, D, varies from one zone to another by at least 3%, or even at least 5% and even 10% or more, and decreases from top to bottom, assuming that the centrifuge is in fiberization position.

Preferably the distance, D, is between 0.8 and 3 mm, for example between 1 and 2 mm and even between 1.4 and 1.8 mm.

It would be advantageous that the preferred centrifuge according to the invention be chosen with an average diameter, DM, less than or equal to 800 mm, in particular at least 200 mm.

The preferred centrifuge is preferably devoided of a bottom in its lowest part. According to this method of realization, the centrifuge is joined with a basket in which the molten glass spreads, preferably joined by mechanical assembling.

According to a preferred method of realization, the preferred device according to the invention includes at least one mechanism of generating a high-temperature gaseous drawing jet in the form of an annular burner, in particular as described in the patents EP 0 189 354 and EP 0 519 797 by the applicant.

It would be advantageous that the annular burner be a tangential burner which includes a mechanism of giving the gaseous drawing jet a tangential component in relation to the outer horizontal edge of the centrifuge, in particular as described in patent EP 0 189 354 by the applicant.

Thus it is possible to obtain an inclination angle of the gaseous drawing jet in relation to the axis of the burner.

It is also possible to use a heating mechanism "internal" to the centrifuge, of the internal burner type. This may play different roles, in particular terminating the thermal conditioning of the molten glass in the "basket" of the centrifuge (term explained below, using the figures), maintaining at an appropriate temperature the glass reserve in the centrifuge in order to continuously remelt-the fibers which are susceptible to adhering to the external walls of the centrifuge.

It may be advantageous to combine the "external" heating method, of the annular inductor type, with this internal heating method; this also permits better control of the temperature of the glass reserve and the remelting of the adhered fibers. In fact, it has been observed that, generally, at low pull rates it was sufficient simply to have recourse to an internal burner, while at high pull rates, the annular inductor proved to be necessary, and the possible addition of the internal burner is beneficial.

When using the here above mentioned preferred centrifuge, it is advantageous that the hot gaseous drawing be accomplished by an annular burner whose parameters of operation may be selected as follows:

preferably, it is possible to regulate the temperature of the gases leaving the burner to at least 1350° C., in particular at least 1400° C. and, for example, between 1400 and 1500° C., in particular between 1430 and 1470° C. The temperature is then adjusted according to the type of composition of the mineral fibers, in particular according to its viscosimetric behavior, it is advantageous to regulate the speed of the gases exiting the burner to at least 200 m/s, measured just at the exit of the lips of the burner, in particular at values between 200 and 295 m/s, One can have recourse to an inductor to heat the lowest zone of the centrifuge and avoid or limit the creation of a temperature gradient over the height of the centrifuge.

Fibers with fewer stress-rising defects in their surfaces and cross-sections are thought to be more resilient under compression, resulting in higher thickness recovery measurements than would be expected in resin-bonded batts having fibers of 3.5 microns, or less in average diameter. Accordingly, products made with these processes are ideal for the high compression storage and transportation needs of modern insulation product packaging.

BRIEF DESCRIPTION OF THE DRAWINGS

The invention will be detailed below using non-restrictive examples illustrated by the following figures:

FIG. 1: a partial view of the centrifugation device according to the invention,

FIG. 4: a partial view of the preferred centrifuge according to the invention,

DETAILED DESCRIPTION OF EXEMPLARY EMBODIMENTS

Figure 2:
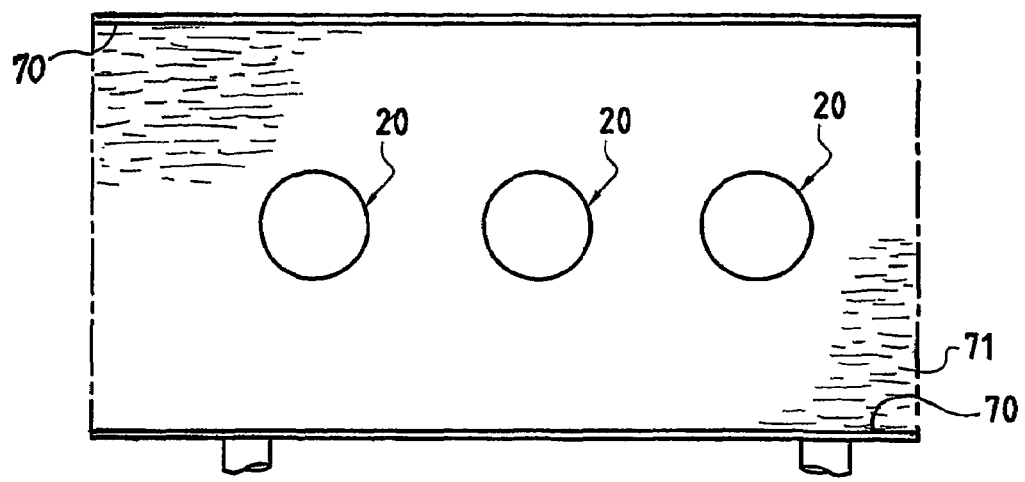
FIG. 2: is a schematic plan view showing a plurality of spinners of this invention arranged over a conveyor.

For the purposes of this specification, use of the term "glass" is intended to include any of the glass mineral materials, such as rock, slag and basalt, as well as traditional glasses such as, for example, E-glass, S-glass, C-glass, E-CR-glass, A-glass, A.R. glass (alkali-resistant, L-glass (lead), D-glass (dielectric), M-glass (high-modulus), with commercial C-glass being the most preferred. While glass material is preferred, this invention has useful application to "thermoplastic materials" which, in addition to glass and other mineral fibers, include polymeric materials, such as polyester, polyethylene and polypropylene fibers. It is expected that both polymer and glass fibers could be used simultaneously in the insulation products of this invention. And finally, although uniform straight fibers can be used herein, this invention also contemplates the use of "irregular fibers", such as, hollow, kinked, and curly fibers, and fibers having irregular or different cross-sectional sizes and/or geometries, such as, for example, small and large round, round and triangular, irregular and round, square and hollow, kinked and round, etc. Such irregular shapes and geometries are known to produce a more uniform lattice structure and volume filling, which allows for higher recovery ratios after being compressed, independent of the number of defects in the fibers themselves. Irregular shaped fibers also reduce irritation, and may make the product less dusty. "irregularity" can also be produced by using more than one molten glass composition having differing coefficients of thermal expansion, differing melting points, differing viscosities, or differing mechanical strengths, used in all the fibers simultaneously, or alternatively among different fiber groups.

It is further understood that the insulation products of this invention can be encapsulated within an exterior plastic layer as disclosed by Schelhorn et al., U.S. Pat. No. 5,277,955, which is hereby incorporated by reference in its entirety. The insulation products of this invention can be, for example, sealed, packed or rolled.

FIG. 1 thus represents a partial view of a system of internal centrifugation using hot gas drawing adapted based on those known from prior art and described, in particular, in patents EP 91 866, EP 189 354 and EP 519 797, which can be referred to for more details on the general aspects of this method of fiberization.

The system includes a spinner or centrifuge 1 attached to a shaft 2. The shaft and the centrifuge are animated by a movement of rapid rotation using an engine not pictured. The shaft 2 is hollow and the glass: in the molten state flows from the feeding mechanism not represented in shaft 2 up to the "basket" 3 in which the molten glass spreads. The basket 3 is also carried along by rotation such that the molten glass is sprayed onto the peripheral wall 4 which is perforated with orifices and, from there, in the form of voluminous glass streams 6 on the peripheral wall 7, usually named "band" of the centrifuge 1, which will form on this wall a permanent reserve of molten glass to supply the circular orifices 14 perforated into said wall. This wall 7 is inclined by about 5 to 10° in relation to the vertical. Of very many circular orifices 14 arranged in rows, are coming out the flow cones 8 extending into pre-fibers 15, projected into the annular gaseous current emitted from the burner 9. Under the effect of this current, these pre-fibers stretch, their terminal portion generating discontinuous fibers 10 which are then collected under the centrifuge. The system also contains a blowing column 11 which creates a "cloud of gas" surrounding the annular gas current generated by the burner 9. There is also an option to use an induction current ring 12 under the centrifuge 1 and/or an internal burner not pictured.

Under the standard conditions, the gap between the lines passing through the center of two parallel rows of orifices, termed the pitch, is constant over the entire height of the band.

Under these conditions, the distance between the centers of neighboring orifices in the same row is also constant.

Thus, in a standard centrifuge, the number of orifices per unit of surface area is constant over the entire surface of the band.

Under standard operating conditions, such a device permits obtaining fibers of an average diameter of at least 2 microns, particularly about 3 to 12 microns.

As discussed hereinafter, the number, size and density of the spinner orifices 14, as well as the attenuation gas parameters are important to the fiberizing of high strength, small fibers less than about 3.5 microns in average dimension, and preferably less than about 3.0 microns in average diameter. Such fibers are desirably distributed in insulation products, such that at least about 40%, and preferably about 50-75% of the fibers have a cross-sectional dimension or diameter which is less than the average diameter or dimension targeted. A typical distribution for a 2.1 average diameter, glass fiber, batt insulation product made in accordance with the principles of this invention is described below in Table 1.

TABLE 1

Fiber Spectrums (2.1 micron ave. diameter sample)

| Diameter (microns) | Content |
|---|---|
| 0 | 23.1% |
| 0.5 | 13.1% |
| 1 | 13.1% |
| 1.5 | 11.3% |
| 2 | 9.1% |
| 2.5 | 6.8% |
| 3 | 5.0% |
| 3.5 | 3.6% |
| 4 | 4.1% |
| 4.5 | 1.8% |
| 5 | 1.4% |
| 5.5 | 2.3% |
| 6 | 1.4% |
| 6.5 | 0.0% |
| 7 | 1.4% |
| 7.5 | 0.0% |
| 8 | 0.0% |
| 8.5 | 0.0% |
| 9 | 1.4% |
| 9.5 | 0.5% |
| 10 | 0.0% |
| 10.5 | 0.0% |
| 11 | 0.0% |
| 11.5 | 0.5% |
| 12 | 0.0% |
| 12.5 | 0.0% |
| 13 | 0.0% |
| 13.5 | 0.5% |
| 14 | 0.0% |
| 14.5 | 0.0% |
| % <2micron | 70% |

A "burner" such as an electric resistance heater, waste gas recycled supply, coal, gas or fuel oil furnace or burner, pressurized air, steam, or any gaseous result of combustion products, can be used to provide a gas current. It is expected, however, that a annular internal combustion burner 9 of substantially conventional construction be disposed above the wall of the spinner in this preferred embodiment. The burner 9 includes an annular blast nozzle 64 spaced above the spinner peripheral wall 7 so as to preferably direct an annular blast downwardly adjacent to the peripheral wall 7 to intercept and attenuate the multiplicity of glass pre-fibers 15 issuing from the orifices 14. The burner 9 includes a preferred metal casing enveloping a refractory liner defining an annual combustion chamber into which an air-fuel mixture is introduced at inlet. The blast nozzle communicates with the combustion chamber and is formed by inner and outer nozzle lips 51 and 56. The blast nozzle lips 51 and 56 respectively include preferred internal cooling channels into which a cooling liquid such as water is introduced by inlet for circulation to an outlet.

In accordance with the main important aspect of the invention, the outer nozzle lips 51 and 56 are spaced at a set distance from one another, as shown in FIG. 1, to provide a less aggressive fiber attenuating environment from conventional combustion air and gas flow rates of conventionally employed burners. Such can be by slightly spreading the burner lips width achieved from about 7.7 mm to greater than about 8.0 mm, and preferably about 8.1-8.5 mm, which reduces the attenuating hot gas speed even though the air flow and gas flow into the burner are not significantly changed from conventional ranges. For example, if a conventional burner employs a burner lips width of about 7.7 mm, an air flow rate of 64,938 ft$^3$/hr. (1840 m$^3$/h) and a gas flow rate 4,038 ft$^3$/hr. (114 m$^3$/h), as shown in Table 2 below, the burner of this invention could reduce the gas current flow rate, even with the equivalent air and gas flow rates, (67,600 ft$^3$/hr) (1915 m$^3$/h) and 4,000 ft$^3$/hr. (113 m$^3$/h), respectively) by increasing the burner lips width to about 8.2 mm. This can be verified by the burner inside pressure, which is known, through experimentation, to be reduced from about 21.8 inches water (555 mm CE) to about 18.8 (inches water) (480 mm CE) for 2.9 micron fibers, and about 21.6 (inches water) (550 mm CE) for 2.1 micron fibers. This is unexpected, since it was earlier believed that increasing burner pressure and blast velocity to achieve greater attenuation was the only adequate means to produce finer fibers. See U.S. Pat. No. 4,759,974; Col. 7, lines 49-57. Of course, lowering the air flow rate, gas flow rate, increasing the size of the combustion chamber, and/or decreasing the amount or rate of combustion, will also have an impact on lowering the attenuating gas speed, and should be considered the practical equivalent of increasing the burner lips width. All of these gas current speed adjustment techniques can be used together or separately. Comparative examples are given in Table 2 and illustrate these unexpected results.

TABLE 2

Example A: Fiberizing Conditions

| | Current Product | Broad | Preferred | A1 | A2 |
|---|---|---|---|---|---|
| Glass Pull Rate (M. Tons/Day) | 22.0 | 18-30 | 22-26 | 19[1] | 16.5[1] |
| Burner lips width (mm) | 7.7 | At least 8 | 8.1-8.5 | 8.2 | 8.2 |

TABLE 2-continued

Example A: Fiberizing Conditions

| | Current Product | Broad | Preferred | A1 | A2 |
|---|---|---|---|---|---|
| Spinner Speed (ft.$^3$/hr) (RPM) | 1,975 | At least 2000 | 2100-2300 | 2,250 | 2,250 |
| Air Flow (ft.$^3$/hr) | 64,938 | 50,000-100,000 | 65,000-85,000 | 69,800 | 80,100$^{(2)}$ |
| Gas Flow (ft.$^3$/hr) | 4,038 | 3,000-6,000 | 4,000-5,000 | 4,330 | 4,970$^{(2)}$ |
| Burner inside Pressure (Inches Water) | 21.8 | 10-25 | 15-22 | 18.8 | 21.6$^{(2)}$ |
| Estimated Fibers Average Diameter (microns) | 3.9 | Less than 3.5 | Less than 3.0 | 2.9 | 2.1 |
| Product Gram Weight$^{(3)}$ (g/ft$^2$) | 104 | 40-210 | 50-150 | 89 | 81$^{(7)}$ |
| Thickness Recovery$^{(3)}$ after 28 days compression (Inches) | 3.92 | 3.5-4.0 | 3.6-3.7 | 3.92 | 3.69$^{(7)}$ |
| R-13 - Thermal Conductivity$^{(4)}$(Btu. in./ft. hr. F.) | 0.268 | 0.200-0.300 | 0.260-0.275 | 0.267 | 0.267$^{(7)}$ |
| Parting Strength$^{(5)}$ gf/g: | | | | | |
| Samples from Production Line Direction | 237, 192, 189, 263, 249 | | | 256, 237, 302, 245, 293 | 166, 128, 180, 156, 184 |
| Samples from Cross Production Line Direction | 161, 220, 233, 201, 213 | | | 276, 206, 234, 256, 245 | 142, 127, 173, 128, 133 |
| Mean | 216 | >100 | 125-205 | 255 | 135 |
| Standard deviation | 31 | | | 29 | |
| Shaking dust from R13: | | | | | |
| Cutting Dust$^{(6)}$ (g) | 0.0021 | <0.0020 | <0.0010 | 0.0009 | 0.0006$^{(7)}$ |
| Floor Dust$^{(6)}$ (g) | 0.0250 | <0.0250 | <0.0200 | 0.0195 | 0.0176$^{(7)}$ |
| Flying Dust$^{(6)}$(g) | 0.0001 | <0.0005 | <0.0003 | 0.0003 | 0.000$^{(7)}$ |

$^{(1)}$This glass pull rate is to keep the equivalent production capacity in square feet with the product density reduction.
$^{(2)}$Estimated data.
$^{(3)}$Gram Weight and Thickness Recovery: ASTM C 167 - Standard Test Methods for Thickness and Density of Blanket or Batt Thermal Insulations
$^{(4)}$Thermal conductivity: ASTM C 518 - Standard Test Method for Steady-State Heat Flux Measurements and Thermal Transmission Properties by Means of the Heat Flow Meter Apparatus and ASTM C 653 - Standard Guide for Determination of the Thermal Resistance of Low-Density Blanket-Type Mineral Fiber Insulation.
(5) Parting Strength: ASTM CSP686—Standard Test Method for Parting Strength of Mineral Firebatt and Blanket-Type Insulation (also, Certain Teed Test Method T-502 Parting Strength of Mineral Insulation Batts and Blankets)
(6) Cutting, Floor and flying Dust: Internal Procedure (Dust measurements Using the Gullfiber Dust Shaking Machine, fibers are counted with a Phase Contrast Optical Microscope or Scanning Electron Microscope. A vacuum cleaner with an air flow of 18 m$^3$/hr is used to collect knife and floor dust. The fibers are collected on a glass fiber WHATMAN GF/A 70 mm filter. A 37 mm filter is used for flying dust. All filters are weighed before and after collection. A 28 cm knife is used, with a maximum sample thickness of 150 mm.).
(7) These results were obtained with the spinner IS-4 at glass pull rate of 14 MT/day on same production line.

Figure 3:
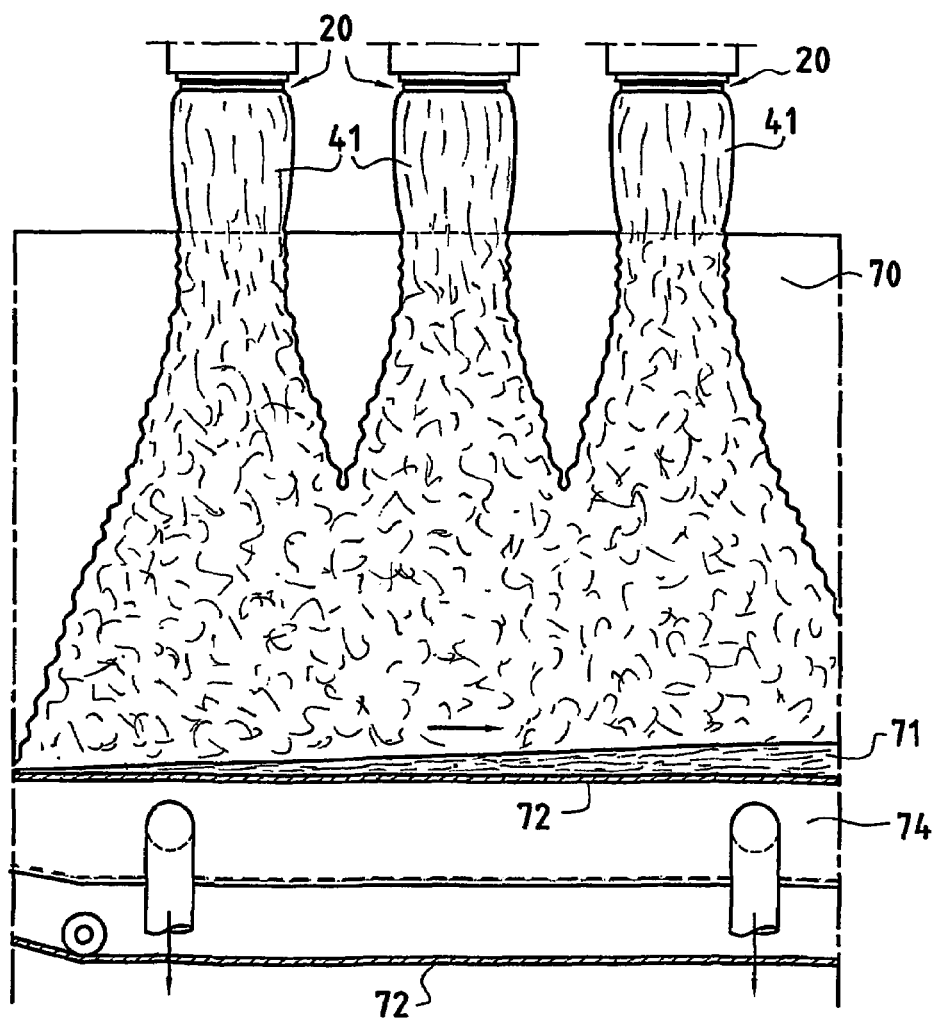
FIG. 3: is a schematic side elevational view of the spinner arrangement of FIG. 2.
Figure 5:
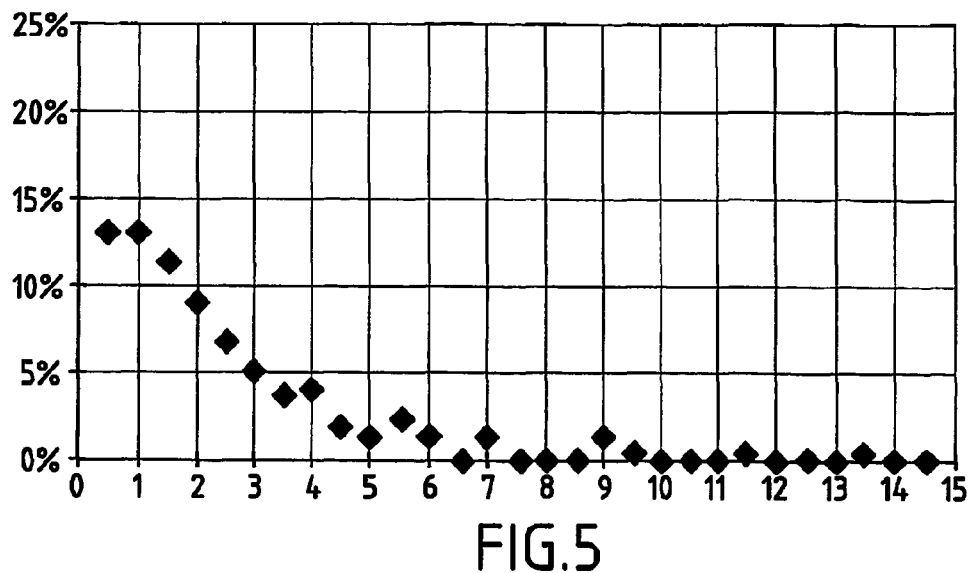
FIG. 5: is a graphical depiction of average fiber diameter vs. numerical percentage of each fiber size in the product, representing a preferred fiber spectrum for an insulation product of this invention which employs a 2.1 micron average fiber diameter.

In order to maintain the heat content of the spinner and fibers during attenuation, an optional high frequency induction current ring 12 can be provided just below the spinner in concentric relation thereto and having an internal diameter somewhat larger than the spinner to avoid interference with the downward flow of fibers entrained by the annular blast. An optional auxiliary blast can be generated by an annular blowing crown 64 disposed outboard of the blast nozzle lips 51 and 56 and connected to a source of pressurized gas such as air, steam or combustion products. The hollow shaft 2 preferably includes several fixed concentric internal tubes. The innermost pair of these tubes defines an annular cooling passage through which cooling water is circulated while the outermost pair define an annular passage through which a combustible mixture can be passed and ignited to preheat the basket 3 prior to startup of the spinner. The fibers 41 generated by the spinner and the gaseous blast pass downwardly into a receiving chamber or receiving hood 70 and are deposited in the form of a blanket 71 on a foraminous conveyor 72 as shown schematically in FIGS. 2 and 3. An optional suction box 74 beneath the conveyor 72 withdraws the high volume of gases passing through the conveyor in a conventional manner. As shown in FIGS. 2 and 3, a plurality of fiberizing stations each having a spinner 20 are conventionally employed for the production of the blanket 71 and in the preferred form of the invention are arranged in a line along the longitudinal axis of the conveyor 72. The number of spinners 20 directing fibers onto a conveyor in an industrial installation might typically be six to ten spinners or more.

For operation of the described apparatus, the centrifuge 1 including the basket 3 thereof, is preheated in a well known manner utilizing the combustion of gases passing through shaft 2, the heat of the burner 9 and induction current ring 12 and similar supplemental sources as may be necessary. With the spinner rotating at a predetermined speed and the burner 9 adjusted to provide a combustion chamber pressure resulting in a blast velocity sufficient to provide the desired attenuation and fineness of the fibers, the molten glass stream is introduced into the hollow spinner shaft 2 from a forehearth or other source of molten glass disposed above the spinner assembly. The stream of molten glass upon reaching the basket 3 flows along the bottom of the basket under the influence of centrifugal force and passes through the orifices of the basket 3 in the form of glass streams 6 which are directed onto the upper portion of the spinner peripheral wall 7.

Under the influence of the stronger centrifugal force exerted at the wall 7, the glass passes through the multiplicity of small orifices 14 and issues at the exterior of the peripheral wall 7 in the form of a multiplicity of streams or pre-fibers 15 which are preferably immediately subject to the attenuating effect of the blast from the internal combustion burner 9 directed across the exterior of the wall. The pre-fibers 15 are maintained in an attenuable condition by the elevated temperature of the blast for a time sufficient to effect attenuation thereof. The fineness of the attenuated fibers is regulated primarily by the control of the blast velocity which in turn is a function of burner pressure. This invention has shown that equal or lower burner pressure and blast velocity, results not only in finer fibers, but finer fibers which have fewer stress-rising defects. These techniques, unexpectedly, have been accomplished in the preferred embodiment without significantly altering the combustion air and gas flow rate to the burner 9, the glass composition, or overall nature of existing equipment. As a result, small fibers, substantially smaller on average than those currently employed in batts and blankets, can be used without sacrificing thickness recovery, even though the density or gram weight is at least about 15% less.

The spinner hole count, size and distribution are important factors in the preferred embodiment methods of this invention. While spinner speed (rpm) is desirably increased from about 1,975 to about 2,250 in Examples A1 and A2 of this invention, such has not been demonstrated to decrease spinner life, but to offer longer fiber. It has been found that the fiberization of small, less than about 3.5 micron average diameter, glass fibers can be greatly improved by increasing the total holes from about 23,000 to at least about 25,000 holes, preferably to about 25,000-40,000, and most preferably to at least about 30,000 holes, while reducing the average diameter of the holes from about 0.86 mm to less than about 0.8 mm, preferably to about 0.78 mm. Additionally, it is desirable that all of the holes, have a maximum cross-sectional dimension of less than 1 mm. These spinner parameters create many more molten glass streams, which are smaller, for producing much smaller fibers. Examples of current production ("control") performance batt spinner specifications are described below in Table 3.

The flow of attenuated fibers into the receiving chamber or receiving hood 70, as shown in FIGS. 2 and 3, is accompanied by the induction of substantial amounts of air. Although the induced air tends initially to restrict the expansion of the veil of fibers flowing from the spinner, the rapid deceleration of the fibers within the receiving chamber produces a substantial expansion of the fiber veil and provides a relatively uniform distribution of the fibers amid the product and across the width of the conveyor. Although a binder spray, such as a phenolic resin, usually is applied to the attenuated fibers at the top of the receiving chamber in a conventional manner, the apparatus for applying the binder has been omitted in FIGS. 2 and 3.

Comparative Examples A1 and A2 were carried out on insulation batts prepared in accordance with the fiberizing conditions of Table 2, and the spinner specifications of Table 3. While ASTM specifications were available for Gram Weight and Thickness Recovery measurements, Thermal Conductivity and Parting Strength, similar specifications were not available for Cutting Dust, Floor Dust and Flying Dust, so these measurements were made by internal plant procedures using a Gullfiber dust shaking machine.

It was further noted that the Gram Weight of identically shaped R-13 products made with conventional 3.9 micron diameter glass fibers and those made from 2.9 micron average diameter (Example A1) and 2.1 micron average diameter (Example A2) fibers showed substantial reductions in density value, namely, the Gram Weight was reduced from about 104 g/ft$^2$ to 89 g/ft$^2$ for Example A1, and to 81 g/ft$^2$ for Example A2. This reduction in gram weight represents a significant potential material cost savings.

In a preferred embodiment of this invention the fiberization process uses a modified distribution of orifices on the band 7 of the centrifuge. A significant adaptation made in the context of this object of the invention appears on FIG. 4.

FIG. 4 represents a partial frontal view of the band 7 of the centrifuge 1, where the orifices 14 perforated in said band are shaded.

In this figure are pictured the two superimposed annular zones ZA1 and ZA2, ZA2 being below ZA1 when the device is viewed in fiberization position. In the case pictured, each of these annular zones includes three circular rows of orifices 14. In the annular zone ZA1 the rows present a pitch P1, the orifices a diameter d1, the distance D1 separates the centers of the closest orifices 14, the distance between the closest edges

TABLE 3

Additional Spinner Specifications

| | Holes | | | | Holes diameter and corresponding rows form top to bottom | | | |
| --- | --- | --- | --- | --- | --- | --- | --- | --- |
| Spinners | Total Rows | Total Holes | Per Row | Diameter | 1 mm | 0.9 mm | 0.8 mm | 0.7 mm | Ave. Size |
| Current Production (Control) | 23 | 23,000 | 1,000 | 600 mm | 4 | 6 | 13 | | 0.86 mm |
| Example A1* | 26 | 31,846 | 1,047 1,178 1,345 | 600 mm | | 6 | 8 | 12 | 0.78 mm |
| Example A2 | 23 | 23,000 | 1,000 | 600 mm | | 5 | 13 | 5 | 0.80 mm |

*Example A1 employed the spinner, described in more detail in Table 4.

of neighboring orifices is DB1, and the number of orifices per unit of surface area is NS1 in the zone ZA1. In the annular zone ZA2, these parameters are respectively P2, d2, D2, DB2, and NS2.

The pitch between ZA1 and ZA2 is called P1/2.

Note on one hand that d2 is less than d1, and that P2 and D2 are, respectively, less than P1 and D1. As a result, NS2 is very much greater than NS1.

This representation is in no way restrictive and a band 7 of a centrifuge 1 may contain more than two annular zones, each of said zones containing at least one series of orifices 14.

In order to illustrate the value of the centrifuge according to the invention, comparative testing was performed, with, on one hand, a standard centrifuge, and on the other hand, a centrifuge according to the invention. The characteristics of the two centrifuges which were selected to have the same average diameter, DM, and the same band surface area, and an identical height of perforated band, are presented in table 4. Each of these centrifuges includes three annular zones each consisting of several rows of orifices of constant diameter and spacing in a row.

TABLE 4

Centrifuge Design of Example B

| | Standard centrifuge Control | Centrifuge according to Example B of the invention |
|---|---|---|
| Diameter (mm) | 600 | 600 |
| Height of perforated band (mm) | 34.25 | 34.25 |
| Number of annular zones (ZA) | 3 | 3 |
| First annular zone ZA1 | | |
| number of rows | 4 | 6 |
| diameter d1 | 1.0 | 0.9 |
| distance D1 | 1.7 | 1.8 |
| distance between edge DB1 | 0.7 | 0.9 |
| pitch P1 | 1.49 | 1.56 |
| number of orifices per row NO1 | 1100 | 1047 |
| orifices/surface area NS1 | 0.39 | 0.36 |
| pitch P1/2 | 1.49 | 1.75 |
| Second annular zone ZA2 | | |
| number of rows | 7 | 8 |
| diameter d2 | 0.9 | 0.8 |
| distance D2 | 1.7 | 1.6 |
| distance between edge DB2 | 0.8 | 0.8 |
| pitch P2 | 1.49 | 1.39 |
| number of orifices per row NO2 | 1100 | 1178 |
| orifices/surface area NS2 | 0.39 | 0.45 |
| pitch P2/3 | 1.49 | 1.55 |
| Third annular zone ZA3 | | |
| number of rows | 13 | 12 |
| diameter d3 | 0.8 | 0.7 |
| distance D3 | 1.7 | 1.4 |
| distance between edge DB3 | 0.9 | 0.7 |
| pitch P3 | 1.49 | 1.22 |
| number of orifices per row NO3 | 1100 | 1345 |
| orifices/surface area NS3 | 0.39 | 0.58 |

The number of orifices per row is noted as NO, and the number of orifices per unit of surface area, NS, is expressed herein as the number of orifices per $mm^2$, where $NS=NO/(\pi.D.P)$ Note that the number of orifices per unit of surface area is constant for the standard centrifuge. In the case of the centrifuge according to the invention, it varies by annular zone and this number, NS, is lower than the one of the standard centrifuge for the highest annular zone, ZA1., and then higher than that of the standard centrifuge for the other annular zones, ZA2 and ZA3. Note that for the centrifuge according to the invention, the number of orifices per unit of surface area increases with the zone, from the top to the bottom of the centrifuge, by about 25 to 30% from one zone to another.

The two centrifuges were manufactured from the same alloy, known under the reference SG30, produced in particular by the company SEVA. The standard centrifuge was perforated using the electroerosion technique described above, while the orifices of the centrifuge according to the invention were perforated using electron bombardment. Laser perforation could also be considered.

Products were manufactured with each of the centrifuges under equivalent pull conditions.

The types of products manufactured, the conditions of fiberization and the mechanical properties measured on the products obtained by this Example are reported in table 5, below:

TABLE 5

Product Properties of Example B

| | Standard centrifuge Control | Centrifuge according to Example A of the invention |
|---|---|---|
| Type of product: | | |
| Nominal thickness (mm) | 80 | 80 |
| Density ($kg/m^3$) | 9.5 | 9.5 |
| Micronaire (l/mm, 5 g) | 13.4 | 13.5 |
| λ (mW/mK) | 41.6 | 41.2 |
| Fiberization conditions | | |
| Pull (t/d) | 23 | 23 |
| Burner | tangential | tangential |
| Basket | standard | standard |
| Burner pressure (mm CE) | 668 | 562 |
| Air output ($Nm^3/h$) | 1953 | 1743 |
| Gas output ($Nm^3/h$) | 120 | 111 |
| Mechanical properties of the product | | |
| Thickness recovery after twelve days | 126 | 131 |
| Thickness recovery after one month | 116 | 126 |
| Tensile strength after manufacture (gf/g) | 180 | 220 |
| Tensile strength after 15 minutes autoclave (gf/g) | 126 | 150 |

The properties measured on products of the same type with each centrifuge are also compared in Table 5.

The thickness recovery is defined as the ratio (in %) between the thickness after compression test and the nominal thickness. It must be noted that the thickness of the product manufactured before compression testing is greater than the normal thickness. In the case of the tests mentioned, the thickness of the product manufactured is 144 mm for a nominal thickness of 80 mm.

From table 5 it can be deduced that the thickness of the fiber mat unloaded after 12 days of compression testing is about 90% of the original thickness (manufacturing thickness) of the fiber mat with the centrifuge according to the invention, and about 80% of the initial thickness with a standard centrifuge.

To conduct the compression test above, panels of fiber mat are prepared after manufacture and loaded to obtain a compression rate of 8/1, i.e. In the case mentioned a compressed thickness of about 18 mm. After the compression time specified (12 days, 1 month), the panels are unloaded (4 panels are tested per compression time) and the average thickness after compression test is determined.

The tensile strength is determined based on a test specimen in the form of ring cut with a punch in a mat of fibrous product. The "tensile strength" is expressed as the limit of the tensile force (breaking force of the ring torn out by two circular and parallel mandrels 12.5 mm in radius, with a load speed of 300 mm/min) in relation to the mass of the test specimen and is expressed in gf/g.

The test specimen, loaded at the start of the test, is a substantially elliptical toric ring of 122×76 mm long and short axes and 26 mm thickness of torr. 15 specimens are tested by product. This test refers to norms BIFT 5012-76 and ASTM C 681-76. The tensile strength is measured on the product after manufacture and, in order to estimate the product's capacity for aging, after an autoclave test. The duration of the autoclave test is 15 minutes, at a temperature of 107° C., a pressure of 0.8 bar and humidity of 100%.

From table 5 it may be observed that for a product of the same type, sharply improved mechanical properties are obtained with the device according to Example A compared to the standard device and at the same time, the energy needed to produce the fibers is significantly reduced.

In fact, the pressure of the burner is lower, about 20% less with the centrifuge according to Example A compared to the results with the standard centrifuge. At the same time, the outputs of fluid, air and gas are relatively smaller, by about 10%. The energy yield of the process is thus very advantageously increased with the centrifuge according to this Example.

The improvement in mechanical properties relates both to the thickness recovery, which is about 10% greater with the centrifuge according to the invention compared to products obtained with a standard centrifuge, and also the tensile strength, which is improved by about 20%.

In addition from these remarkable results, it was noted that, unexpectedly, the increase in the number of orifices of the centrifuge does not have a negative effect on the life span of the centrifuge, when the latter is made according to the instructions of this Example.

Under the fiberization conditions defined in table 5, the life span of the centrifuge according to the invention was about 370 hours and that of the standard centrifuge was about 300 hours.

In the same way, it is noted that the quality of the products does not vary significantly with the time of use in fiberization of a spinner, although it might have been feared that the increase in the number of holes per unit of surface area may lead to accelerated aging of the centrifuge accompanied by a rapid deterioration in the properties of the product during fiberization with the same spinner.

It is noted that the configuration described for the centrifuge according to this Example in table 4 is especially advantageous from a geometric point of view. In fact, while increasing the number of orifices in the centrifuge, the inventors were able to define a geometric configuration where the space between the edges of the orifices, DB1, is increased in relation to that of the standard centrifuge in the annular zone, ZA1, where the orifices have the largest diameter, D1, and where corrosion and erosion are the most active. In the median annular zone, ZA2, the space between edges of orifices, DB2, is identical in both configurations, and in the annular zone, ZA3, with the smallest diameter, D3, the configuration chosen permits decreasing the distance between edges of orifices, DB3, which is not harmful because corrosion and erosion are not as great there.

Thus, very advantageously, the mechanical properties of the centrifuge are preserved, and its life span can be maintained or increased compared to a standard centrifuge, while considerably increasing the number of orifices.

Figure 6:
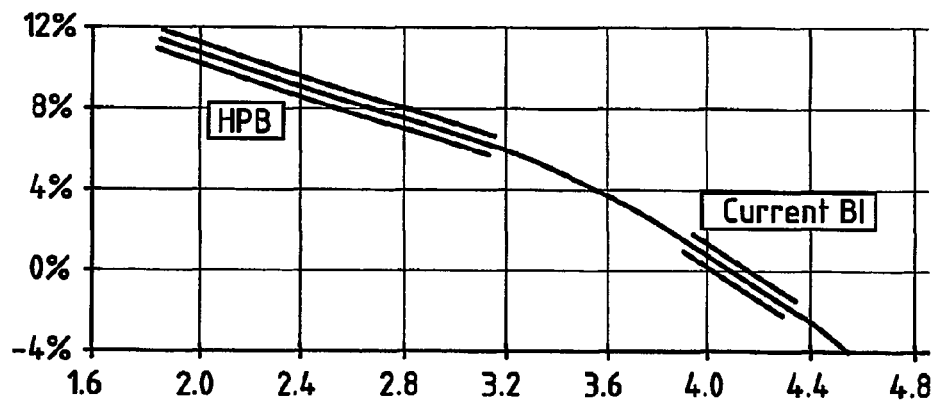
FIG. 6: is a graphical depiction of R-value variations versus average fiber diameter for a typical commercial batt insulation product and a high performance batt insulation product produced in accordance with this invention.
Figure 7:
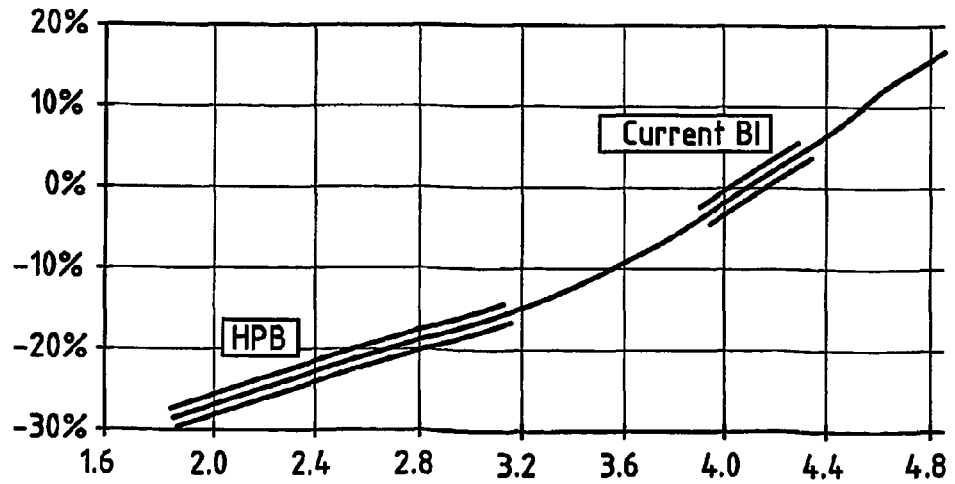
FIG. 7: is a graphical depiction of density variation versus fiber average diameter for a typical commercial batt insulation product and a high performance batt insulation product produced in accordance with this invention.

The general advantages of the invention can also be illustrated by the estimations of the Thermal Performance (for fixed density) or density for fixed R-value variation with average fiber diameter. The High Performance Batt product ("HPB") and commercial Building Insulation product ("Current BI" or "Control") gram weight comparison can be estimated, as follows, for some of the more popular R-rated products (thermal resistance or "R-rating" as measured by product thickness) (in)/thermal conductivity (BTU·in/ft·hr·° F.)), for example, A1 and A2. Results for currently produced building batt insulation, ("Current BI"), and high performance batt insulation ("HPB") products are provided FIGS. 6 and 7. For a fix product density, a decrease of the average glass fiber diameter can offer an increase in R-value. FIG. 6 shows the estimated variation of thermal insulation performance (variation of R values, in %) calculated for the same density, as the function of the glass fiber average diameter (in micrometer). The range "Current BI" represents the actual situation for Certain Teed batt insulation production in the market. The range "HPB" depicts the estimated thermal resistance performance boost provided by this invention. Quite the same as FIG. 6, FIG. 7 shows the estimated variation of density (in %) for a fixed R-value, as the function of the glass fiber average diameter (in micrometer): for a fixed R-value, the product gram weight or density can be reduced when the average glass fiber diameter decreases. With batt products produced in accordance with this invention, smaller glass fibers result in reduced product gram weight for improved insulation performance. The curves of FIGS. 6 and 7 generally follow the pattern of estimated data points provided in Table 6.

TABLE 6

Batt Gram Weight Comparison

| BI Product Rating | HPB Gram Weight g/ft$^2$ | Current BI Gram Weight g/ft$^2$ | Gram Weight Reduction |
| --- | --- | --- | --- |
| R-11 | 51 | 71 | 28% |
| R-13 | 81 | 107 | 24% |
| R-15 | 139 | 182 | 24% |
| R-19 | 85 | 118 | 28% |
| R-30 | 131 | 179 | 27% |

The process parameters for Examples A1 and A2 produced batts that were very soft to the touch and cotton-ball-like in texture, with virtually little itching upon skin contact. They both produced high thermal resistance values, similar to the current commercial production of 3.9 micron average diameter fibers, resulting in test results having the same R-value with a gram weight or density reduction of at least 12%, and preferably about 15-28%. The insulation products of Examples A1 and A2 were also comparable or better in ASTM C 167 thickness recovery to current production batt insulation. This is important since batt and roll products of densities less than 2.5 lbs./ft$^3$ are often highly compressed to a thickness much lower than their nominal thickness, at least about ½, and preferably about ⅐$^{th}$ to ¹⁄₁₂$^{th}$, of their nominal thickness, for example when packed in order to reduce the storage and freight costs. The products are required to recover their nominal thickness at the job site after opening of the package. While it was formerly believed that reductions in the fiber's diameter in batt and roll products would improve the thermal and acoustic insulation properties of these products, it was rarely attempted in practice, since small average diameter fiber insulation typically failed to resume its nominal thickness after compression. As reflected in Examples A1 and A2 of this invention, full thickness recovery was achieved for both products, even though the product gram weight was dramatically reduced with the decrease in the average fiber diameter.

From the foregoing, it can be realized that this invention provides improved insulation products composed of fine glass fibers having fewer defects. These products are less expensive to produce and recover their full thickness following compression, while also providing the same R-rating as higher density, larger average diameter fiber insulation products. The processing techniques of this invention are capable of producing small fibers of less than about 3.5 micron average diameter with fewer stress-rising defects due to a combination of a spinner with more and smaller orifices and/or a gentler blast velocity. Although various embodiments have been illustrated, this was for the purpose of describing and not limiting the invention. For example, the high strength fibers produced by the claimed processes of this invention could be useful in producing composite reinforcement, loose-fill insulation, woven and non-woven fabrics, and can also be applied to plastic resin compositions to improve fiber performance. Various other modifications, which will become apparent to one skilled in the art, are within the scope of this invention described in the attached claims.

The invention claimed is:

1. A method of making a glass fiber insulation product, comprising:
   (a) providing at least one glass material;
   (b) melting the glass material;
   (c) disposing said molten glass material in a spinner having a plurality of spinner orifices;
   (d) centrifuging the molten glass material through said plurality of spinner orifices to form a multiplicity of glass streams;
   (e) attenuating said glass streams with a gas current adjacent an exterior of the spinner to form glass fibers having an average diameter of no greater than about 3.5 microns, said gas current being substantially provided by a burner having a burner pressure of about 10-25 inches of water (250-635 mm CE), said burner having a pair of burner lip portions separated by a width of at least 8 mm; and
   (f) combining the fibers together with a resinous binder to form an insulation product having an ASTM C 686 parting strength of at least about 100 gf/g, and exhibiting a substantial recovery of its nominal thickness following compression;
   wherein the spinner of (c) and (d) has a peripheral band that is perforated with orifices distributed in a plurality of annular zones arranged on top of each other with the spinner in centrifugation position, and which includes at least two annular zones whose number of orifices per unit of surface area differs by at least a value of 5%, and wherein the annular zone containing a greatest number of orifices per unit of surface area is located below another annular zone, assuming that the spinner is in centrifugation position, wherein each annular zone of the spinner has orifices grouped in at least one row, with a distance between adjacent orifices in each row being substantially constant in each annular zone, and with the distance between adjacent orifices in each annular zone decreasing from one annular zone to another from a top to a bottom of the peripheral band.

2. The method of claim 1, wherein said attenuating (e) comprises the burner employing an airflow of about 50,000-100,000 ft$^3$/hr.

3. The method of claim 1, wherein said attenuating (e) comprises the burner employing a gas flow rate of about 3,000-6,000 ft$^3$/hr.

4. The method of claim 1, wherein a diameter of the orifices are substantially constant in each annular zone and decrease from one annular zone to another, from the top to the bottom of the peripheral band of the spinner.

5. The method of claim 1, wherein said rows are spaced from each other at a distance between 1 and 2 mm, with a pitch from one row to the next of between 1 and 2 mm.

6. The method of claim 1, wherein a diameter of at least a part of the orifices of the spinner is at most 1.5 mm.

7. The method of claim 1 wherein a distance between centers of closest orifices neighboring a same annular zone of the spinner is substantially constant over an entire annular zone, and wherein this distance varies from one zone to another by at least 3% and is decreasing from the top to the bottom, with in particular a distance between 0.8 and 3 mm.

8. The method of claim 1, wherein the spinner presents an average diameter from 200 mm to 800 mm.

9. The method of claim 1, wherein gas current of (e) is produced by an annular burner.

10. The method of claim 9 wherein the annular burner is a tangential burner that includes a mechanism of giving the gas current a tangential component in relation to an external horizontal edge of the spinner.

11. The method of claim 1, wherein each annular zone of the spinner has orifices grouped in at least two rows, with a pitch of the rows in each annular zone decreasing from one annular zone to another from the top to the bottom of the peripheral band of the spinner.

12. A method of making a glass fiber insulation product, comprising:
   (a) providing at least one glass material;
   (b) melting the at least one glass material;
   (c) disposing said molten glass material in a spinner having a plurality of spinner orifices distributed in a plurality of annular zones that includes at least two annular zones whose number of orifices per unit of surface area differs by at least a value of 5%, wherein each annular zone of the spinner has orifices grouped in at least one row, with a distance between adjacent orifices in each row being substantially constant in each annular zone, and with the distance between adjacent orifices in each annular zone decreasing from one annular zone to another from a top to a bottom of the spinner;
   (d) centrifuging the molten glass material through said plurality of spinner orifices to form a multiplicity of glass streams;
   (e) attenuating said glass streams with a gas current adjacent an exterior of the spinner to form glass fibers having an average diameter of no greater than about 3.5 microns; and
   (f) combining the fibers together with a resinous binder to form an insulation product exhibiting a substantial recovery of its nominal thickness following compression.

13. The method of claim 12, wherein a diameter of the orifices are substantially constant in each annular zone and decrease from one annular zone to another, from the top to the bottom of a peripheral band of the spinner.

14. The method of claim 12, wherein each annular zone of the spinner has orifices grouped in at least two rows, with a pitch of the rows in each annular zone decreasing from one annular zone to another from the top to the bottom of a peripheral band of the spinner.

15. The method of claim 12, wherein said rows are spaced from each other at a distance between 1 and 2 mm, with a pitch from one row to the next of between 1 and 2 mm.

16. The method of claim 12, wherein a diameter of at least a part of the orifices of the spinner is at most 1.5 mm.

17. The method of claim 12, wherein a distance between centers of closest orifices neighboring a same annular zone of the spinner is substantially constant over an entire annular zone, and wherein this distance varies from one zone to another by at least 3% and is decreasing from the top to the bottom, with in particular a distance between 0.8 and 3 mm.

18. The method of claim 12, wherein gas current of (e) is produced by an annular burner.

19. The method of claim 18, wherein the annular burner is a tangential burner that includes a mechanism of giving the gas current a tangential component in relation to an external horizontal edge of the spinner.

* * * * *